(12) United States Patent
Descombes et al.

(10) Patent No.: US 11,848,816 B2
(45) Date of Patent: Dec. 19, 2023

(54) OPTIMIZING POWER CONSUMPTION OF M-IOT DEVICES

(71) Applicant: Hewlett Packard Enterprise Development LP, Spring, TX (US)

(72) Inventors: Pierre-Yves Descombes, Isere (FR); Karthik Murugan, Chennai Tamil Nadu (IN); Biswadeb Dutta, Chestnut Hill, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/938,362

(22) Filed: Oct. 6, 2022

(65) Prior Publication Data

US 2023/0344704 A1    Oct. 26, 2023

(30) Foreign Application Priority Data

Apr. 22, 2022 (EP) .................................... 22305604

(51) Int. Cl.
*G06F 15/177* (2006.01)
*H04L 41/0803* (2022.01)
(Continued)

(52) U.S. Cl.
CPC ...... *H04L 41/0803* (2013.01); *H04L 41/0833* (2013.01); *H04L 41/0893* (2013.01); *H04L 41/142* (2013.01); *H04L 41/16* (2013.01)

(58) Field of Classification Search
CPC ............. H04L 41/0893; H04L 41/0833; H04L 41/085; H04L 41/0853
See application file for complete search history.

(56) References Cited

U.S. PATENT DOCUMENTS 10,219,193 B2    2/2019 Kim et al.
2019/0364492 A1    11/2019 Azizi et al.
(Continued)

FOREIGN PATENT DOCUMENTS

WO    2020/236047 A1    11/2020

OTHER PUBLICATIONS

3GPP, "3rd Generation Partnership Project; Technical Specification Group Services and System Aspects; Study on Application Capability Exposure for IoT Platforms; (Release 18)", Technical Report, V0.4.1 , 2021, 18 pages.
(Continued)

*Primary Examiner* — Wing F Chan
*Assistant Examiner* — Joseph R Maniwang
(74) *Attorney, Agent, or Firm* — Hewlett Packard Enterprise Patent Department

(57) ABSTRACT

The present disclosure provides techniques for optimizing power consumption of Massive-Internet of Things (IoT) devices comprising a plurality of IoT devices. According to some examples, a power optimizer system may obtain one or more operational parameters of a plurality of IoT devices. The power optimizer system may estimate a Power Cost Function (PCF) based on one or more operational parameters to determine power consumption of each IoT device. The power optimizer system may determine a variation in the PCF of one or more IoT devices out of the plurality of IoT devices due to variations in uplink and downlink operations of each IoT device. The power optimizer system may identify one or more optimal operational parameters and then, configure the one or more IoT devices of the plurality of IoT devices with the one or more optimal operational parameters.

19 Claims, 7 Drawing Sheets

(51) Int. Cl.
*H04L 41/0893* (2022.01)
*H04L 41/16* (2022.01)
*H04L 41/142* (2022.01)
*H04L 41/0833* (2022.01)

(56) References Cited

U.S. PATENT DOCUMENTS

2019/0394061 A1* 12/2019 Chen .................. H04L 12/283
2020/0244573 A1    7/2020 Cui et al.
2021/0123771 A1*  4/2021 Vega .................... H04Q 9/00
2022/0103442 A1*  3/2022 Cheng ................ H04L 43/028

OTHER PUBLICATIONS

Nain et al., "RIATA: A Reinforcement Learning-Based Intelligent Routing Update Scheme for Future Generation IoT Networks", vol. 9, IEEE, 2021, pp. 81161-81172.

Nassef et al., "Optimising Performance for NB-IoI UE Devices through Data Driven Models", Journal of Sensor and Actuator Networks, 2021, 16 pages.

Goudarzi et al., "An IoT-based Prediction Technique for Efficient Energy Consumption in Buildings", IEEE Transactions On Green Communications and Networking, vol. 5, No. 4, Jun. 22, 2021, 13 Pages.

Samikwa et al., "Adaptive Early Exit of Computation for Energy-Efficient and Low-Latency Machine Learning over IoT Networks", IEEE, 2022, 7 pages.

* cited by examiner

OPTIMIZING POWER CONSUMPTION OF M-IOT DEVICES

BACKGROUND

Internet of Things (IoT) devices may enable gathering, processing, and exchanging of data across an application/IoT platform. For example, IoT devices may be sensors, surveillance equipment, or any other smart devices having embedded therein a computing system that enables these smart devices to gather, connect and exchange data over a network. Further, certain categories of IoT devices, that may be driven by scale rather than speed, are finding their way into large-scale IoT solutions. To offer connectivity to such large-scale devices, e.g., Massive IoT (M-IoT), communication systems, such as Fifth Generation (5G) communication systems, are being actively pursued. These M-IoT devices may communicate with a network using simplified communication protocols or protocols adapted to reduce the processing power available for a particular IoT device. Moreover, M-IoT devices may use small capacity power sources and their consumption may vary depending on the rate of recurrence of communication and network usage by IoT devices.

BRIEF DESCRIPTION OF THE DRAWINGS

The present disclosure, in accordance with various examples, is described in detail with reference to the following figures. The figures are provided for purposes of illustration only and merely depict examples, wherein.

Figure 1:
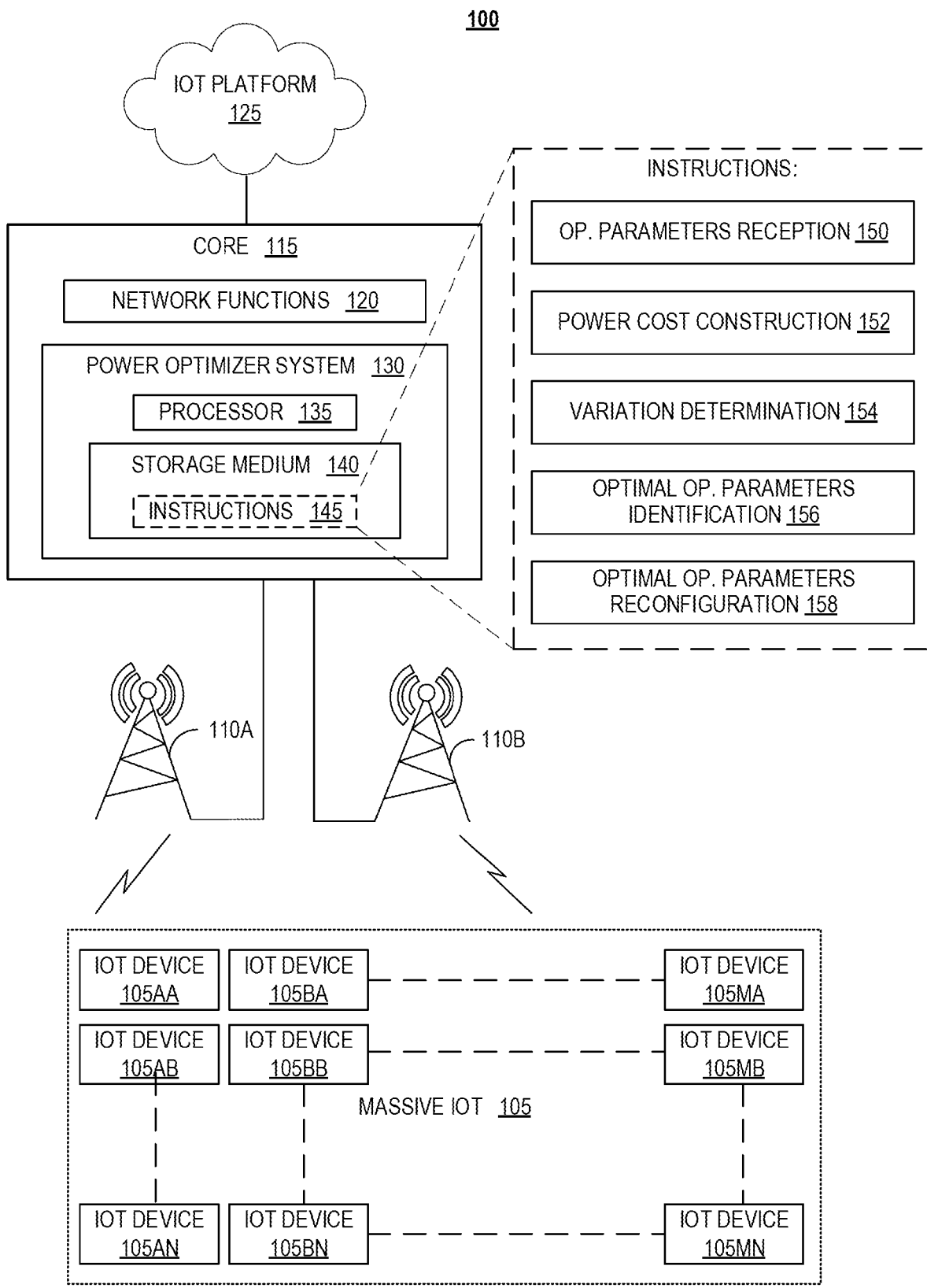
FIG. 1 illustrates an example network environment that is used for optimization of power consumption of Massive-IoT devices, in accordance with the present disclosure.

The figures are not exhaustive and do not limit the present disclosure to the precise form disclosed.

DETAILED DESCRIPTION

With the evolution of communication systems, standards such as 5G may be capable of supporting a large number of devices (e.g., about a million devices per square kilometer) when compared to earlier communication standards, such as fourth-generation Long Term Evolution (4G-LTE). To provide this improved capability, network slicing may be used to optimize network usage of devices that are connected to the network. Network slicing may refer to a logical partitioning of mobile broadband networks into multiple virtual networks. Each network slice may be used to provide service to a specific use case and/or a defined Quality of Service in a resource-efficient manner. With the advent of Internet of Things (IoT) applications, a large portion of this network capability may be utilized to support Massive IoT (M-IoT) deployments. Traditional IoT deployments may refer to critical IoT devices that may be deployed in small numbers with high reliability/low latency requirements. M-IoT deployments may refer to services that use a large number of devices, such as sensors, actuators, etc. Data generated/communicated by these devices can be small. In some instances, these M-IoT deployments may include constrained-IoT devices, which may have limited processing, storage, networking, and/or power source capabilities. With evolving use cases, a service provider or an enterprise customer deploying these devices may have limited exposure to categories of M-IoT devices or sensors that are being used. Hence, service providers or enterprise customers may have challenges in optimizing communication with these devices.

For instance, a service provider may not be equipped to identify and/or configure these diverse categories of IoT devices/use cases when they are onboarded onto the network. In some instances, a service provider may identify a use case (e.g., Narrowband-IoT, NB-IoT), but identification of a specific operating profile of that particular use case may be a challenge. An operating profile may include a communication profile (between device and application), a standby/idle cycle, and similar parameters. These operating profiles may influence the network usage and power consumption of an IoT device. Due to such challenges associated with the identification and/or configuration of a device during onboarding, devices may exhibit erratic power consumption. In some instances, this may result in inefficient communication resulting in higher power consumption. High power consumption of M-IoT devices may lead to frequent maintenance of device batteries, which can be challenging and costly to maintain, especially for devices that are physically remote or dispersed. In some other instances, a device is configured with an appropriate operating profile but may exhibit anomalies during operation. In such instances, a service provider may not be able to identify such misconfigurations. For instance, a service provider may not have visibility of various use cases, communication requirements of use cases, optimal communication profiles, etc. Moreover, users/applications may get affected due to inefficient communication.

Furthermore, considering the scale at which the M-IoT devices operate, it may be challenging to detect any deviation in the behavior of an individual IoT device. With varied use cases and operational patterns, some of the conventional detection methods may not be viable at this scale. For example, it may be difficult to visualize device operational patterns and to detect any sub-optimal configurations that cause frequent network usage. Moreover, large amounts of computational resources may be used to process such a large quantity of data corresponding to M-IoT devices.

The present disclosure provides techniques for the discovery of any misconfigurations and/or anomalies in the communication pattern of M-IoT devices. In the examples discussed herein, IoT devices may be low-power devices with power saving characteristics. Misconfiguration and/or anomalies may include infrequent and/or sub-optimal network usage (e.g., inefficient uplink, downlink, power saving, etc.), which may lead to poor power saving. Further, techniques disclosed, upon discovery, may include an identification phase for identification of IoT devices that can be good candidates for reconfiguration. Moreover, optimal parameters for reconfiguration of the IoT devices may be selected during the discovery phase. To aid in discovery and identification, Machine Learning/Artificial Intelligence techniques may be used as will be described further herein.

According to some examples, to aid in the optimization of power consumption, a power optimizer system may be provided for the discovery, identification, and/or reconfiguration of IoT devices in an M-IoT deployment. In one example, the power optimizer system may be deployed in a core of a communication system (e.g., 5G), which enables communication between M-IoT devices and an IoT platform. In some other examples, the power optimizer system may be deployed on-premise, at the edge, or in proximity to the M-IoT deployment.

The power optimizer system may obtain operational parameter records corresponding to the communication of M-IoT devices. According to some examples, the operational parameters may define various operational states of a device over a network. These operational states can be a communicating state(s), an idle state, a power saving state, etc. The communication state(s) of the operational parameter records may include uplink and downlink conditions. The operational parameter records can be logged or recorded as time-sequenced data corresponding to various operational states of a device. The operational parameter records can be obtained from at least one of a Virtual Network Function at a core of a communication system, an interfacing component between a core and an IoT platform, a server configured to record/store log data, or the power optimizer system itself.

According to some examples, the power optimizer system may analyze operational parameter records to cluster the IoT devices and identify any anomalies in the communication pattern within any of the clusters. For example, anomalies may refer to devices exhibiting abnormally frequent network usage, which can be due to a misclassifications of devices, a misconfiguration during onboarding, or variations occurring during operation. In some other examples, IoT devices may be subject to Distributed Denial-of-Service (DDoS) attacks. A DDoS attack may compromise limited resources in IoT devices, such as storage, processing, and/or network capacity, thereby affecting IoT applications. In an example, a DDoS attack may cause an IoT device to generate higher traffic, which may cause higher network usage and high power usage. In some examples, the power optimizer system may cluster the IoT devices based on uplink and downlink data taken over a timer horizon. Responsive to the discovery of anomalies, the power optimizer system may further analyze operational parameter records to identify a cluster of devices that can be optimized for efficient network usage and power consumption.

In various examples, during the discovery phase, the power optimizer system may construct a Power Cost Function for each IoT device based on the operational parameter records. The Power Cost Function may provide the estimated power consumption of each IoT device. In an example, the M-IoT devices may be categorized and clustered by Power Cost Function. In some examples, categorization/clustering of the M-IoT devices may be performed using ML/AI techniques. In further examples, for each cluster, the power optimizer system may mine for frequent sequential patterns. In some examples, the power optimizer may discover that a subset of IoT devices of a cluster is misconfigured by determining that the cluster includes more than one frequent sequential pattern.

As per some examples, M-IoT devices may be clustered based on statistical measures by using ML/AI techniques. In some examples, unsupervised ML/AI techniques, such as the K-Means algorithm can be used for clustering. In some examples, the power optimizer system may construct probability distribution functions of the time difference between successive uplink/downlink information of each IoT device. In some examples, the power optimizer system may use the operational parameter records to determine the time difference between successive uplink/downlink operations. The power optimizer system may construct probability distribution functions for the determined time differences between successive uplink/downlink operations. The probability distribution functions may be characterized by statistical measures, such as a mean, median, mode, etc., which may be used for clustering of devices. Further, clusters may be ranked based on a centroid of each cluster represented by statistical measures. That is, one or more statistical measures may be used as data points for clustering devices and for determining a centroid of each cluster. The clusters may be ranked based on a value(s) of those statistical measures, say in ascending order, per an example.

As per some examples, the power optimizer system may select one or more clusters as candidates for reconfiguration. In an example, the power optimizer may identify one or more clusters with the smallest values of statistical characteristics. In a further example, a cluster with the smallest centroid values can be the cluster that may be selected for optimization. According to some examples, the power optimizer system may select optimal parameters (e.g., power saving timers, uplink/downlink time, etc.) based on estimated Power Cost Functions. In an example, the power optimizer system may determine a ratio of network consumption by a device to data exchanged with an IoT application by using the Power Cost Function. The power optimizer system may select a ratio such that a device consumes minimal/optimal network resources to communicate a complete uplink and/or downlink of message set. In an example use case of gas meters deployed in an M-IoT deployment, operational parameters used by certain meters that have the best ratio (e.g., lowest) can be selected to optimize identified candidates (e.g., selected clusters for optimization). In one example, the identified candidates may be configured with these optimal parameters. In one example, operational parameters, such as communication timers, idle timers, sleep/power saving mode timers, etc. may be altered at the device level, network level, or at an interfacing component level.

According to further examples, the power optimizer may work in conjunction with a secondary optimizer system. In an example, the secondary optimizer system can be deployed on a Service Capability Server (SCS) that acts as a gateway between an IoT platform and a network. In a further example, the secondary optimizer system may be interfacing a core of a communication system and an IoT platform enabling the exchange of data between IoT devices and applications. Otherwise, in some existing systems, the IoT platform may communicate messages to the IoT devices when they are on standby thereby causing inefficient network and battery usage. This may cause the IoT devices to wake up and communicate when they are supposed to be in a standby mode saving power. According to examples of the present disclosure, the power optimizer system may communicate optimal operational parameters to the secondary optimizer system such that the secondary optimizer system may synchronize parameters of a communication standard used for IoT with the optimal parameters of the devices.

In some examples, techniques discussed herein may be used for discovery and identification phases, as discussed earlier. Identified optimal operational parameters may be used for reconfiguration of cluster candidates reconfiguration, in response to a determination of variations.

In some examples, the power optimizer system may include a processor and storage medium embedded with instructions for discovery, identification, and/or reconfiguration, as discussed herein. The processor and the storage medium can be hardware resources. In some further examples, a power optimizer system can be implemented as a combination of both software (e.g., a computer program product) and hardware.

The following detailed description refers to the accompanying drawings. Wherever possible, the same reference numbers may be used in the drawings and the following description to refer to the same or similar features. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

FIG. 1 illustrates an example of network environment 100 that is used for optimization of power consumption of M-IoT devices. In some examples, M-IoT applications may use a large number of IoT devices (e.g., hundreds to millions of devices) that may not be latency-sensitive and may have low throughput. However, these IoT devices may consume low energy on a network. In some examples, M-IoT devices may be battery-powered devices, such as sensors, actuators, computing devices, etc. These devices can be tailored to fit any specific application and deployed in massive numbers, making them fit for use in M-IoT applications.

The network environment 100 of FIG. 1 may include M-IoT devices 105. The M-IoT devices 105 may be composed of a plurality of IoT devices 105AA-105AN, 105BA-105BN, . . . , 105MA-105MN, which may be low power devices with power savings capabilities. In some examples, the IoT devices 105AA-105MN may use a machine-to-machine protocol(s) over a Constrained Application Protocol (CoAP) for communication. Herein, the terms "M-IoT devices" and "plurality of IoT devices" may be interchangeably used. The network environment 100 may correspond to M-IoT applications, such as asset tracking, smart organization, environmental monitoring, smart metering, smart manufacturing, monitoring building/campus/enterprise, etc. Further, the IoT devices may include medical devices, communication devices, household appliances, enterprise devices, and/or suitable networked devices. The plurality of IoT devices 105 may each be equipped with communication components to transmit/receive data to/from an application platform. The processing power and power consumption of this plurality of IoT devices 105 may vary depending on the use case, form factor, etc. The plurality of IoT 105 devices may sense and update data either periodically or when there may be a change in the sensed data, e.g., a change reaching or crossing a threshold value.

In various examples, the plurality of IoT devices 105 may be a constrained-type, e.g. have limited resources. For instance, these devices may have limited power sources, limited processing capability, and/or limited communicating capabilities. The plurality of IoT devices 105 may generate infrequent traffic using small data. In various examples, the plurality of IoT devices 105 may use low power consumption based protocols for communicating data with an IoT platform 125. The IoT platform 125 can be an integration of tools and services used for collection of data from the M-IoT devices 105. In one example, a smart gas meter may be an IoT device that periodically sends usage data to an IoT platform and may stay in a power saving mode or idle mode when not transmitting data. These IoT devices may include an active mode and an idle mode. In active mode, the IoT devices communicate data and in idle mode, they save energy by limiting communication in one or both directions. However, sensing or monitoring operations associated with the IoT devices may continue, per some examples.

Further, these M-IoT devices 105 may be communicatively connected to a communication system. In some examples, the communication system can be a 5G communication system with network slicing capabilities. The network environment 100 may include one or more network access nodes, such as base stations 110A and 110B, of the communication system. In an example, the network access node may be a gNodeB in a 5G communication system. A gNodeB is a 5G base station that uses a New Radio (NR) technology with radios featuring Software Defined Radio (SDR) with various Multiple Input Multiple Output (MIMO) options. MIMO enables sending and receiving multiple data signals simultaneously over a common radio channel thereby offering larger network coverage/capacity to support M-IoT deployments. One or more network access nodes may interface with a core 115 of the communication system. For example, 5G Core (5GC) is a core of 5G communication systems that include a plurality of Network Functions (NFs) 120 for managing subscription, authentication, access, routing, packet gateway control, etc. that form radio and network connections. Thus, the M-IoT devices 105 may form uplink and/or downlink connections for transmittal and/or receival of data, respectively. In some examples, an uplink connection may include an uplink registration. In some examples, an IoT device may perform an attach and/or a registration procedure with/without a Packet Data Network (PDN) connection. Thus, during an uplink operation, a device may first complete a registration procedure before communicating actual data. In some examples, a device may have to perform this registration procedure to communicate data after exiting a power saving mode or an idle mode.

As per various examples, the M-IoT devices 105 may be Narrow Band Internet of Things (NB-IoT) or Long Term Evolution Category M1 (LTE Cat-M1) based devices as defined by the Third Generation Partnership Project (3GPP). These standards may correspond to Low Power Wide Area Network (LPWAN). In some examples, these devices may have a Power Saving Mode (PSM) and/or an Extended Discontinuous Reception (eDRX) Mode.

In PSM, a device may disable its cellular radio but may stay registered to the network to stay in a power-saving mode, A device may negotiate two timers with the network. The two timers may include an active timer (e.g., T3324) and an Extended periodic Tracking Area Update timer (e.g., T3412). A device may activate PSM by including these two timer values during an attach or Tracking Area Update (TAU) operation. Periodically, a TAU may be used by the IoT device to notify the network regarding its availability. T3324 timer may indicate the duration for which a device might be available. A device may activate the T3324 timer when it moves from a 'connected' to 'idle' state. Upon expiration of the T3324 timer, the device moves to PSM. In PSM, a device may enter power saving mode thereby reducing power consumption. T3412 timer may define extended time for a device to send periodic TAU. The difference between these two timers (T3412-T3324) may define PSM time.

According to some examples, PSM may work in conjunction with eDRX mode or eDRX mode may be used independently. eDRX mode may be used to switch off the receiver of the device for a moment, such that the device may not be listening to the network. eDRX mode may also use two timers, namely, a Paging Cycle Length (PCL) and a Paging Time Window (PTW). PTW may correspond to an active state of an eDRX cycle. 'Paging' may refer to informing and/or notifying a device about various events. A duration for which a device may be inactive or in a sleep state may be defined by eDRX cycle. Further, an eDRX cycle may be modified based on the use case. In some other examples, other power saving timer protocols, such as Discontinuous Transmission (DT), may be used.

Further, referring back to FIG. 1A, the core 115 may include a power optimizer system 130. According to various examples, the power optimizer system 130 may operate as an optimizing point for one or more operational parameters of the massive IoT devices 105. In one example, the power optimizer system 130 may be a Virtualized Network Function (VNF) deployed on a computing system, a virtualized infrastructure (e.g., VMWare), or a container orchestration platform. Further, the one or more operational parameters may include an uplink time, a downlink time, a standby time, etc. The uplink time and the downlink time may be collectively referred to as "active/availability timer," as per some examples. Herein, the terms 'time' and 'timer' may be used to indicate duration.

Further, the power optimizer system 130 may include a processor 135 and a storage medium 140 storing (e.g., encoded with) instructions 145. In one example, the storage medium 140 may be a non-transitory and machine-readable type. The instructions 145 may include at least: operational parameters reception instructions 150, power cost estimation instructions 152, power cost variation determination instructions 154, optimal operational parameters identification instructions 156, and optimal operational parameters application/reconfiguration instructions 158. The processor 135 may execute the instructions 145 stored in the storage medium 140 to identify optimal operational parameters (e.g., uplink time and downlink time) and may selectively reconfigure M-IoT devices 105 for power efficiency.

The processor 135 may execute the operational parameter reception instructions 150 to receive operational parameter records corresponding to the plurality of the IoT devices 105 connected to the network. The operational parameters may include data corresponding to active timers, such as uplink and downlink time, sleep timer, power saving mode timer, etc. used by the plurality of IoT devices 105 for sending and receiving data to/from the IoT platform 125. Whereas, "operational parameter records" may refer to operational state information of the IoT devices logged by an interfacing system, as per some examples. For example, each IoT device of the plurality of IoT devices 105, such as sensors, computing devices, communication devices, or the like, may transmit and receive traffic via the core 115. The power optimizer system 130 may include a subsystem configured to record and/or store operational parameters of the M-IoT devices 105.

The processor 135 may execute the power cost estimation instructions 152 to estimate a Power Cost Function (PCF) based on one or more operational parameters for the plurality of IoT devices 105. The PCF may indicate a power consumption cost of each device for its uplink, downlink, standby/idle, or similar operations over a time horizon. In various examples, a cost per operation for each category of IoT device may be predetermined. In other examples, the cost per operation may be dynamic and/or based on additional parameters, such as weather conditions, temperature of devices during operation, etc.

Further, the processor 135 may execute the power cost variation determination instructions 154 to determine that some of the IoT devices out of the plurality of IoT devices 105 may exhibit different patterns of operational parameters (e.g., PSM and/or eDRX timers) and thereby exhibit different power consumption patterns. In various examples, the plurality of IoT devices 105 may be clustered such that devices with similar uplink and downlink count/count fractions are grouped together. Devices within a cluster may exhibit different frequent sequential patterns of fractional counts of the uplink and downlink thereby indicating a misconfiguration or anomalies in the configuration of the IoT devices.

The processor 135 may execute the optimal operational parameters identification instructions 156 to identify optimal operational parameters (e.g., power saving timers) exhibited by some of the IoT devices of the plurality of IoT devices 105. In one example, a PCF may be used to identify optimal operational parameters. In further examples, supervised or unsupervised ML/AI techniques may be used for the identification of optimal operational parameters. Further, the processor 135 may estimate a vector for a device, and the vector may represent statistical characteristics of the probability distribution. The probability distributions may be used to cluster devices with similar probability distributions such that a centroid of the clusters may be represented by a statistical characteristic from the vector. A cluster with relatively smaller values of features can be selected for optimization using the optimal parameters that are identified from the Power Cost Function. In an example, the processor 135 may construct probability distribution functions for the determined time differences between successive uplink/downlink operations. The probability distribution functions may be characterized by statistical measures, such as a mean, median, mode, etc., which may be used for clustering of devices. For example, one or more statistical measures may be used as data points for clustering devices and for determining a centroid of each cluster. The clusters may be ranked based on a value(s) of those statistical measures at the centroid. One or more clusters with the smallest values of statistical measures/features at the centroid.

The processor 135 may execute the optimal operational parameters reconfiguration instructions 158 to reconfigure the one or more IoT devices (e.g., a cluster of devices) of the plurality of IoT devices 105 with the one or more optimal operational parameters that are identified earlier during PCF estimation. With the reconfiguration of selected IoT devices of the plurality of IoT devices 105, the operational parameters (e.g., power saving timers) are optimized. This optimization enables optimized network usage for efficient communication of data with the IoT platform 125. For example, the optimal operational parameters may synchronize device communication with the transport protocol of the network.

Figure 2:
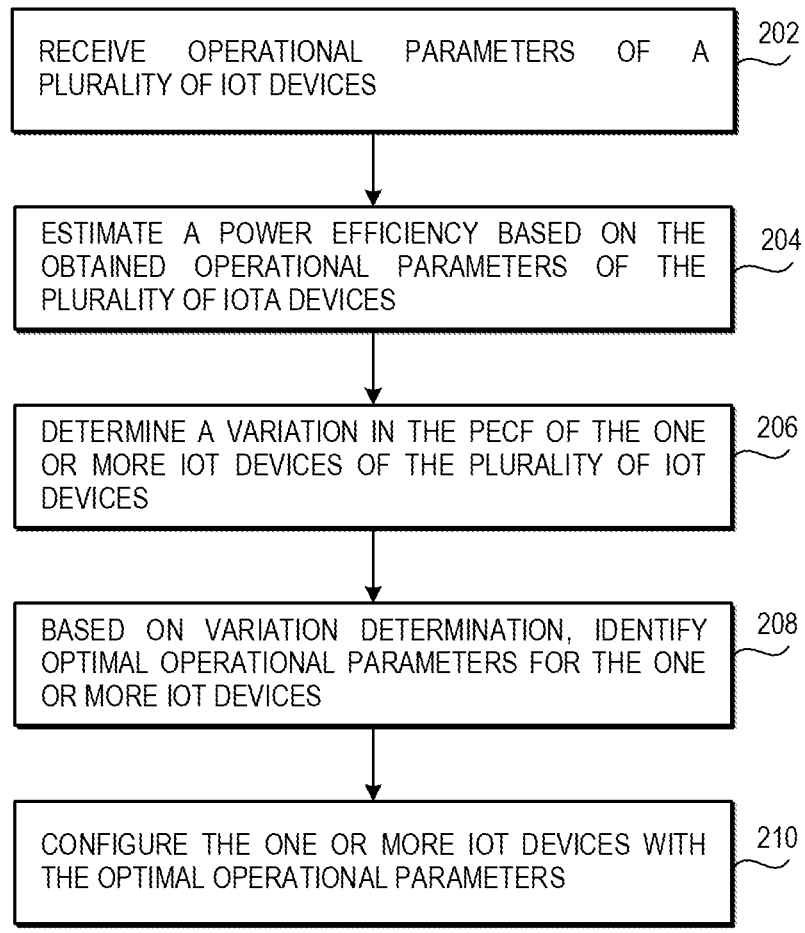
FIG. 2 illustrates a schematic view of a flowchart corresponding to a method of optimizing operational parameters of IoT devices, according to various examples of the present disclosure.

FIG. 2 illustrates a schematic view of a flowchart corresponding to method 200 of optimizing operational parameters of IoT devices. In some examples, method 200 may be encoded as instructions on a machine-readable storage medium and/or executed by a processor that causes the processor to perform one or more actions. For example, the instructions may be stored on the storage medium 140 and executed by the processor 135 of FIG. 1.

In the ongoing example, at block 202, the instructions may be executable by the processor to obtain operational parameter records corresponding to the plurality of the IoT device(s) 105 connected to a network. The operational parameter records may include data corresponding to an uplink/downlink timer, standby timer, paging timer, etc. The plurality of IoT devices may each communicate data, by attaching metadata to it, for describing a data type during an uplink operation. Further, IoT application(s) deployed on an IoT platform may communicate downlink data with the M-IoT devices. Further, the instructions may be executable by the processor to obtain these operational parameter records with which the plurality of IoT devices may be currently configured.

As per some examples, the operational parameters may refer to various operational states of a device over a network. These operational states can be an uplink/downlink state, an idle state, a power saving state, etc. The uplink denoted as 'UL' may refer to a process of sending data from a device to an IoT platform/application. The downlink denoted as 'DL' may refer to a process of sending data from an IoT platform/application to a device. In some examples discussed herein, uplink and downlink operations may be performed via a communication system. In some examples, in an idle state, a device may be in a partial power saving state as it allows only downlink. Uplink operations may be suspended in an idle state. A power saving mode/state can be a deep sleep state, where a device may be registered on a network but may not allow uplink and downlink operations.

At block 204, the instructions may be executable by the processor to estimate the power consumption of each of the plurality of IoT devices. According to some examples, a PCF estimate may indicate the power consumption of each IoT device based on the obtained operational parameters. For example, an IoT device may consume 'x' amount of power for each uplink operation, 'y' amount of power for each downlink operation, 'z' amount of power during standby operation, etc. A cumulative (x+y+z . . . ) of power consumed for these operations may be used to estimate overall consumption. This may enable the processor to predict the overall power consumption of each IoT device during its operation over a time horizon. Further, the processor may determine a period for which the battery of IoT may last or may warrant a replacement/maintenance. That is, the processor may be configured to extrapolate the power consumption to determine a life of a power source, such as a battery.

At block 206, the instructions may be executable by the processor to determine that some of the IoT devices out of the plurality of IoT devices may exhibit different patterns of operational parameters. For example, certain devices within a cluster may exhibit frequent uplink and/or downlink states, which may cause higher power consumption when compared to other devices within the same cluster. This may cause those IoT devices to thereby exhibit erratic power consumption patterns. In some examples, time-series data from the operational parameter records of the plurality of IoT devices may be processed using unsupervised ML/AI technique(s) to discover any anomalies in communication patterns of the plurality of the IoT devices.

At block 208, the instructions may be executable by the processor to identify optimal operational parameters (e.g., power saving timers) exhibited by some of the IoT devices of the plurality of IoT devices. In various examples, optimal operational parameters may be selected from the estimated PCF. Further, unsupervised ML/AI techniques may be used for the identification of candidate devices for reconfiguration. In one example, identification may include constructing probability distribution functions of successive uplink and/or downlink data for each device. Further, the instructions may include further instructions to construct a vector for each device. The vector may represent statistical characteristics of the probability distribution of the difference between successive uplink/downlink operations for each device. The probability distributions may be used to cluster devices with similar probability distributions. One or more clusters with relatively smaller values of features can be selected for optimization.

At block 210, the instructions may be executable by the processor to reconfigure one or more IoT devices of the plurality of IoT devices with the one or more optimal operational parameters identified above. With the reconfiguration of selected IoT devices of the plurality of IoT devices, the operational parameters may be synchronized with transport protocol parameters, such that the network usage may be optimized for efficient communication of data with the IoT platform.

Figure 3:
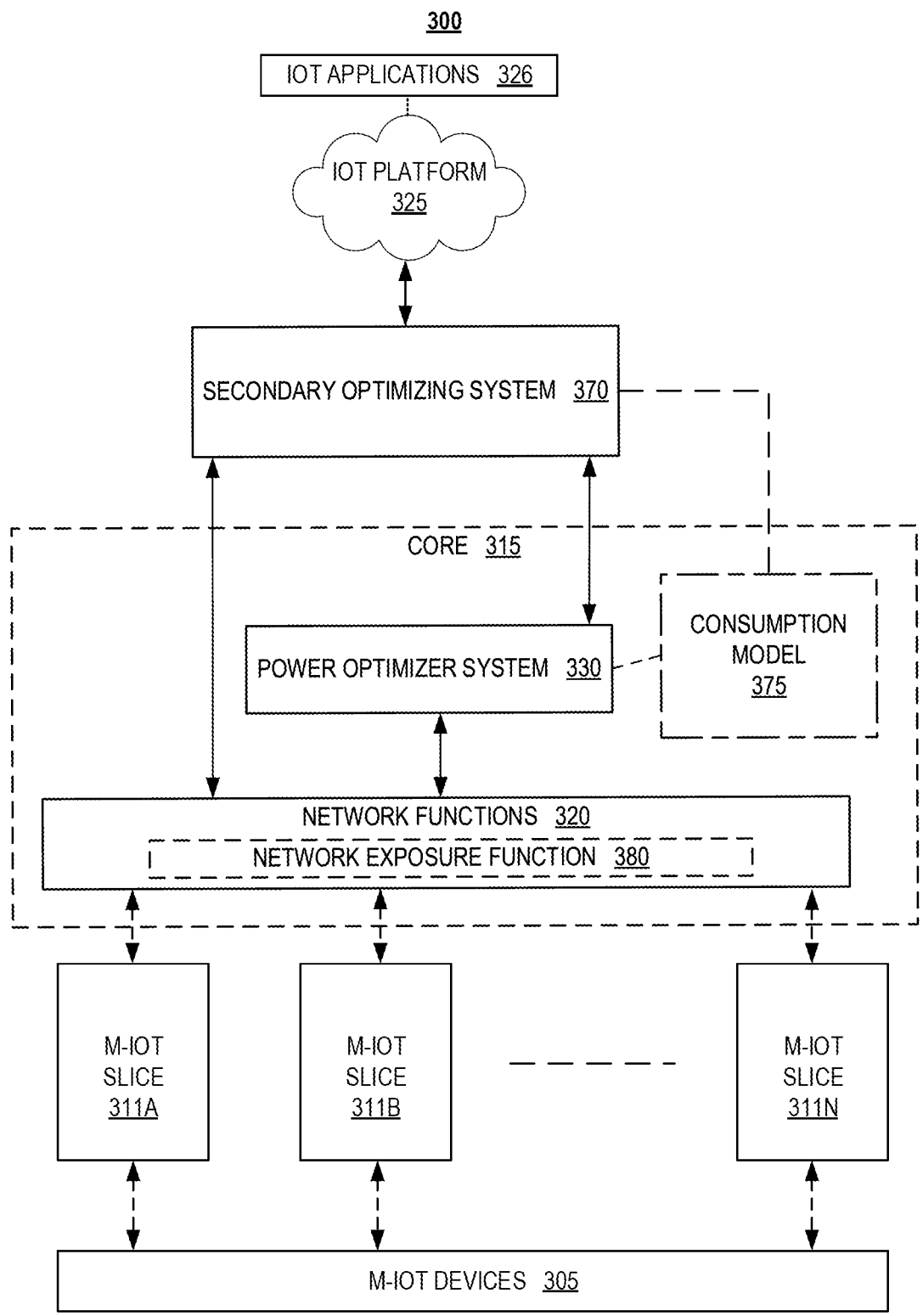
FIG. 3 illustrates a schematic view of a network environment that is used for optimization of power consumption of Massive-IoT devices, according to various examples of the present disclosure.

FIG. 3 illustrates a schematic view of a network environment 300, according to various examples of the present disclosure. According to various examples, the network environment 300 may include M-IoT devices (a plurality of IoT devices) 305. The M-IoT devices 305 may be of a homogeneous and/or heterogeneous type and may correspond to the same or different IoT solutions. According to various examples, the M-IoT devices 305 may connect to a communication system, such as a 5G communication system for transmittal/receival of data. In some other examples, other communication systems, such as a Fourth Generation Long-Term Evolution (4G-LTE) or other standards defined by 3GPP can be used. The communication system may provide shared network resources among various IoT solutions. This may be in addition to sharing of infrastructure (e.g., computing, network, storage) for applications/services in isolation.

The M-IoT devices 305 may connect to a core 315 of the communication system via a plurality of IoT slices 311A-311N. IoT devices under one IoT slice may correspond to an application that uses low latency and high capacity. IoT devices under another IoT slice may correspond to autonomous devices that may work under moderate latency and high capacity. A consumption meter, such as a gas meter, electricity meter, or water meter may be various examples of the latter case. Accordingly, during onboarding and/or activation of the plurality of IoT devices, availability timers (e.g., active timers) may be set. In one example, a default or preconfigured value may be selected for availability timers based on a use case or IoT device type. "Availability timers" may infer power-saving timers or operational parameters, as discussed herein.

In various examples, the network environment 300 may include a secondary optimizer system 370. The secondary optimizer system 370 may be deployed as a gateway between IoT platform 325 and the core (e.g., 5GC) 315. Further, one or more IoT applications 326 may be deployed on the IoT platform 325. In various examples, the secondary optimizer system 370 may be a Service Capability Server (SCS) or a Service Capability Gateway (SCG) configured to provide an interface with 3GPP systems. Further, the secondary optimizer system 370 may have access to existing operational parameter records (e.g., log data).

In further examples, the core 315 may include a plurality of Network Functions (NFs) 320. The NFs 320 may include a Network Exposure Function (NEF) 380. According to various examples, the NEF 380 may facilitate secure access to network services and capabilities of the communication system, for accessing the availability timers.

In various examples, the secondary optimizer system 370 may be configured to adjust operational parameters, such as transport protocol parameters such that the existing availability timers/power saving timers of the plurality of IoT devices may be in synchronization with the protocol parameters. In one example, the secondary optimizer system 370 may configure timers (e.g., eDRX timers, Paging Cycle Length (PCL), and Paging Time Window (PTW)) such that they are aligned with Constrained Application Protocol (CoAP) parameters (e.g., ACK_TIMOUT). This may limit the duplication of downlinks. Thus, the secondary optimizer system 370 may reduce/eliminate inefficiencies in downlink communication. Otherwise, the IoT platform 325 may send/re-send paging messages to IoT devices during their standby operation. The IoT devices may exhibit improved characteristics due to reduced network usage thereby improving the power consumption of the M-IoT devices 305.

Further, a power optimizer system 330 may be deployed on the core 315. The power optimizer system 330 and the secondary optimizer system 370 may have access to a consumption model 375. In various examples, the consumption model 375 may include power consumption metrics for various operations performed by various categories of devices deployed in M-IoT deployment. For example, power consumption metrics for each operation, such as paging, standby, uplink, downlink, etc. may be recorded or made available in the consumption model. For example, power consumption may be in milliampere-hour (mAh).

In various examples, the uplink and downlink data may be logged and the power optimizer system 330 may retrieve operational parameters from log data. In various examples, the log files may be built by the secondary optimizer system 370, or a network function of the core 315. The power optimizer system 330 may estimate a Power Cost Function (PCF) by utilizing the consumption model 375. In other words, a PCF may be estimated for each IoT device of the M-IoT devices 305 by correlating connectivity attempts based on availability timers, with application transmissions attempts when the IoT platform 325 communicates with the M-IoT devices 305. For example, correlation information may indicate whether during an availability timer/active cycle (e.g., device awake) a complete exchange of data between the device and an IoT application has occurred. As alluded earlier, connectivity attempts of the IoT devices with the network and the application transmission attempts of the IoT application with the IoT device may be performed during an active period. Further, according to one example, "availability timers" may refer to an active timer/T3324 during which an IoT device may be accessible and a sleep timer/T3412 during which the IoT device may perform an attach procedure. In some examples, "availability timers" may correspond to power saving timers, such as paging time window, PCL, or PTW as defined in the eDRX standard.

In various examples, supervised or unsupervised Machine Learning (ML)/Artificial Intelligence (AI) techniques may be applied to estimate PCF. In various examples, the ML/AI techniques may be applied to the uplink-downlink data, which can be used as the basis for estimating the PCF function. The estimated PCF can then be used to identify optimal timer values. The optimal timer values may be inferred from the analyzed values for the time differences between successive uplink and downlink session information of an IoT device with the IoT platform 325 or 5G M-IoT slices 311A-311N. The M-IoT 305 devices may be, selectively, reconfigured with the optimal timer values such that the IoT device(s) may consume optimal network resources for uplink and downlink messages upon reconfiguration. Accordingly, M-IoT devices may consume power optimally thereby, for example, improving battery life of devices and reducing the need for frequent battery replacements.

In various examples, the optimal availability timer value(s) may be a function of additional parameters, such as local peculiarity, seasonality, weather, etc. In some further examples, sample data from certain IoT devices may be captured for various use cases that are organized per geographical clusters and operated regularly to capture seasonality and/or weather dimensions. In various examples, timer values obtained from such techniques may be used to configure the M-IoT devices.

In various examples, ML/AI techniques can refer to methods that, through the use of algorithms (e.g., K-Means clustering algorithm, Prefix-span-based sequential pattern mining algorithm, etc.), may provide informational models based on input data, which may not be visually or analytically perceived by humans. In ongoing examples, implementation of the optimizing system(s) may include machine learning techniques in enterprise environments, e.g., businesses, that help provide better services and products to customers, due to efficient usage of networks, optimal power consumption, etc. According to further examples, the techniques disclosed herein for optimization of power usage by optimizing network usage and for reconfiguration of M-IoT devices may involve a discovery phase, an identification phase, and a reconfiguration phase as elaborated in subsequent examples.

Figure 4:
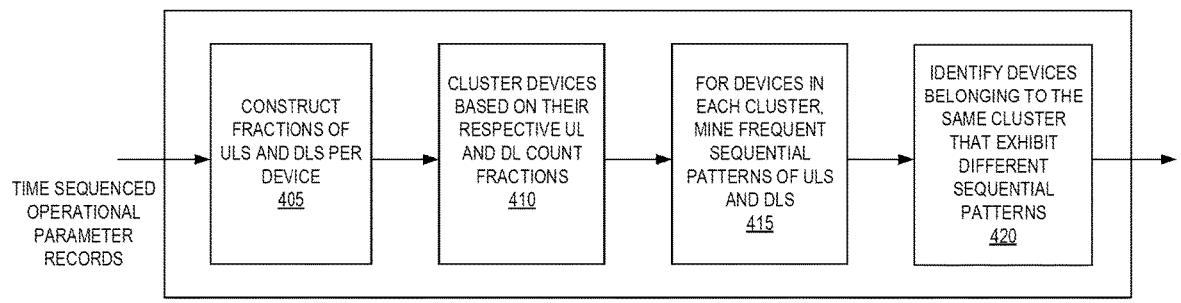
FIG. 4 illustrates a schematic representation of a discovery phase, according to various examples of the present disclosure.

FIG. 4 illustrates a schematic representation of a discovery phase for anomalies and/or misconfiguration of M-IoT devices. In the discovery phase, frequent sequential patterns may be mined by the power optimizer system to identify any anomalies and/or misconfiguration of IoT devices. In various examples, for mining frequent sequential patterns, operational parameters based on which uplink and downlink session frequencies are configured may be received by a power optimizer system. The operational parameters may be obtained over a time horizon for a plurality of IoT devices.

In various examples, time series/time-sequenced operational parameter records of the M-IoT devices are received by the power optimizer system. Uplink and downlink time-sequenced data can be extracted from these operational parameter records. In some examples, the operational parameter records may refer to logs that are related to uplinks. Further, "uplink data" may include registration uplink and payload uplink. Further, an interval between registration uplink and payload uplink, and/or an interval between payload uplinks may be considered. Using the uplink and downlink data, fractions of observed uplinks (UL) and downlinks (DL) may be calculated for each IoT device 405 out of the plurality of IoT devices. Herein, "IoT device" may be referred to as 'device' for brevity. For example, a fraction of uplink (UL) and (DL) data may be based on UL and DL counts divided by the total number of ULs and DLs per device for a given time horizon. The percentages of ULs and DLs per device may be gathered for various devices. In one example, the percentages of ULs and DLs may be used as the input dimensions to assemble clusters using an unsupervised clustering algorithm.

Further, fractioned UL and DL data may be used to cluster devices based on their respective UL and DL count fractions 410. The plurality of IoT devices may be clustered into a plurality of clusters/families. Herein, the term 'clustering technique' may be understood as used in the context of unsupervised machine learning. In various examples, a K-Means algorithm may be used to cluster the fractional counts of ULs and DLs per device. A variety of clustering approaches may be used for categorizing these devices. In one example, a standard K-Means clustering can be performed. In another example, in addition to the K-Means algorithm for clustering, hashing, vectorization, or other normalization techniques may be employed based on the complexity of operational data. In further examples, clustering techniques, such as hierarchical, Density-Based Spatial Clustering of Applications with Noise (DBSCAN), and cluster analysis while Dimension Reduction (DR) tasks most often use Principal Component Analysis (PCA), Linear Discriminant Analysis (LDA), Non-Negative Matrix Factorization (NNMF) and autoencoder methods to reduce the computational complexity.

In some examples, for given data, an attribute may be provided for each UL or DL referred to as the "resource path". The resource path attribute may be used to partition UL and DL records into separate sub-families of records. The resource path could be used as a categorical variable to achieve refined grained clustering. This enables devices assigned for a specific function to be categorized within the same cluster.

For each cluster out of the plurality of clusters, frequent sequential patterns of UL and DL data 415 may be mined for devices in the same cluster. In various examples, time series of UL and DL data of devices in the same cluster may be used to identify frequent sequential patterns. In one example, a Prefix-Span-based sequential pattern mining technique(s) may be used for mining sequential patterns. Pattern mining techniques may enable the discovery of various patterns from data. Various patterns can be based on one or more of frequent item set(s), association(s), sequential rule(s), and periodic pattern(s). In other words, subsequences may be mined for sequential data based on various criteria. The criterion may include a frequency, length, and/or a pattern of occurrence of subsequences. In the current examples, "frequent sequential patterns" may be used to mine the most frequent patterns of ULs and DLs in non-overlapping, contiguous, time slices.

Devices belonging to the same cluster but exhibiting different sequential patterns 420 may be identified through frequent sequential patterns. In various examples, devices within a cluster may exhibit different sequential patterns. Thus, the discovery of anomalous sequential patterns may be achieved, which can be due to misconfiguration during onboarding and/or due to variations over time. On discovery of anomalous sequential patterns, AI/ML techniques enable identification of devices, which can be good candidates for the configuration of optimal parameters such that the energy consumption of the M-IoT devices may be optimized and battery life may be extended.

Figure 5:
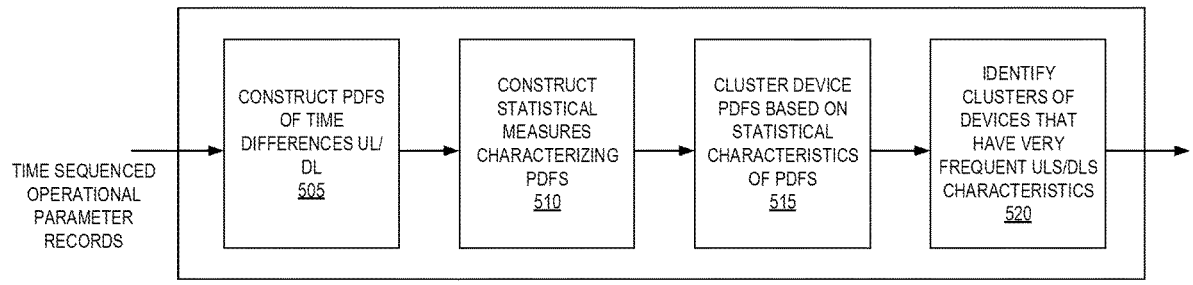
FIG. 5 illustrates a schematic representation of an identification and reconfiguration phase of M-IoT devices, according to various examples of the present disclosure.

FIG. 5 illustrates a schematic representation of an identification and reconfiguration phases of M-IoT devices. Based on the discovery of anomalies/misconfigurations, identification may be performed through an analysis of the statistics of the time differences/intervals between successive ULs and DLs, for different categories of devices (e.g., between clusters of devices). Further, a discrete probability distribution function of time differences 505 between successive ULs and DLs, for different categories of devices (e.g., inter UL/DL time differences), may be constructed. In various examples, the Probability Distribution Function (PDF) may be characterized using standard statistical measures 510, such as minimum and maximum values, mean, median, mode, standard deviation, deciles, quartiles, quintiles, skewness, and/or kurtosis.

Further, the plurality of IoT devices may be clustered using the statistical characteristics of the PDFs of the devices 515. The clustering performed during this phase may aggregate devices with similar statistical characteristics or PDFs. For instance, devices found in one cluster may have UL and DL data with similar or "nearer" statistical characteristics. Whereas devices from different clusters may have UL and DL data with statistical characteristics "distant" or "far away" from one another when compared to UL, DL data from devices within the same cluster.

In various examples, the statistical measures of the probability distributions of time differences between successive ULs and/or DLs for each device may be used to construct a vector for each device. Dimensions of the vector may represent statistical characteristics of the probability distribution. In one example, this may be a feature engineering part of the ML/AI techniques. That is, clustering of devices based on characteristics of probability distribution functions. For example, a K-Means algorithm may be used to break probability distributions into clusters of similar probability distributions. Similarly, in some examples, asymmetric distance between PDFs, also known as the resistor-average distance, derived from the asymmetric Kullback-Leibler distance, may be used as the distance metric to cluster the PDFs of the devices.

The clustered probability distribution functions data may be used to identify clusters of devices that have similar ULs/DLs characteristics 520. In various examples, to identify clusters of devices with similar UL/DL data characteristics, the clusters may be ranked based on values of the dimensions/features of the vectors representing the centroid of each cluster. 'Centroid' can be an imaginary or real location representing the center of the cluster. For a K-Means algorithm, the 'K' number of centroids may be selected. Further, data points can be allocated to a nearest cluster and a smallest value within the cluster is selected as the centroid iteratively. According to techniques disclosed herein, upon clustering the UL/DL characteristics, a cluster with the smallest values of the features may be a cluster of devices that can be selected as good candidates for optimizing the timers to optimize energy/battery consumption. In some examples, the smallest values of features may indicate a higher frequency of occurrence of uplink/downlink operations.

Figure 6:
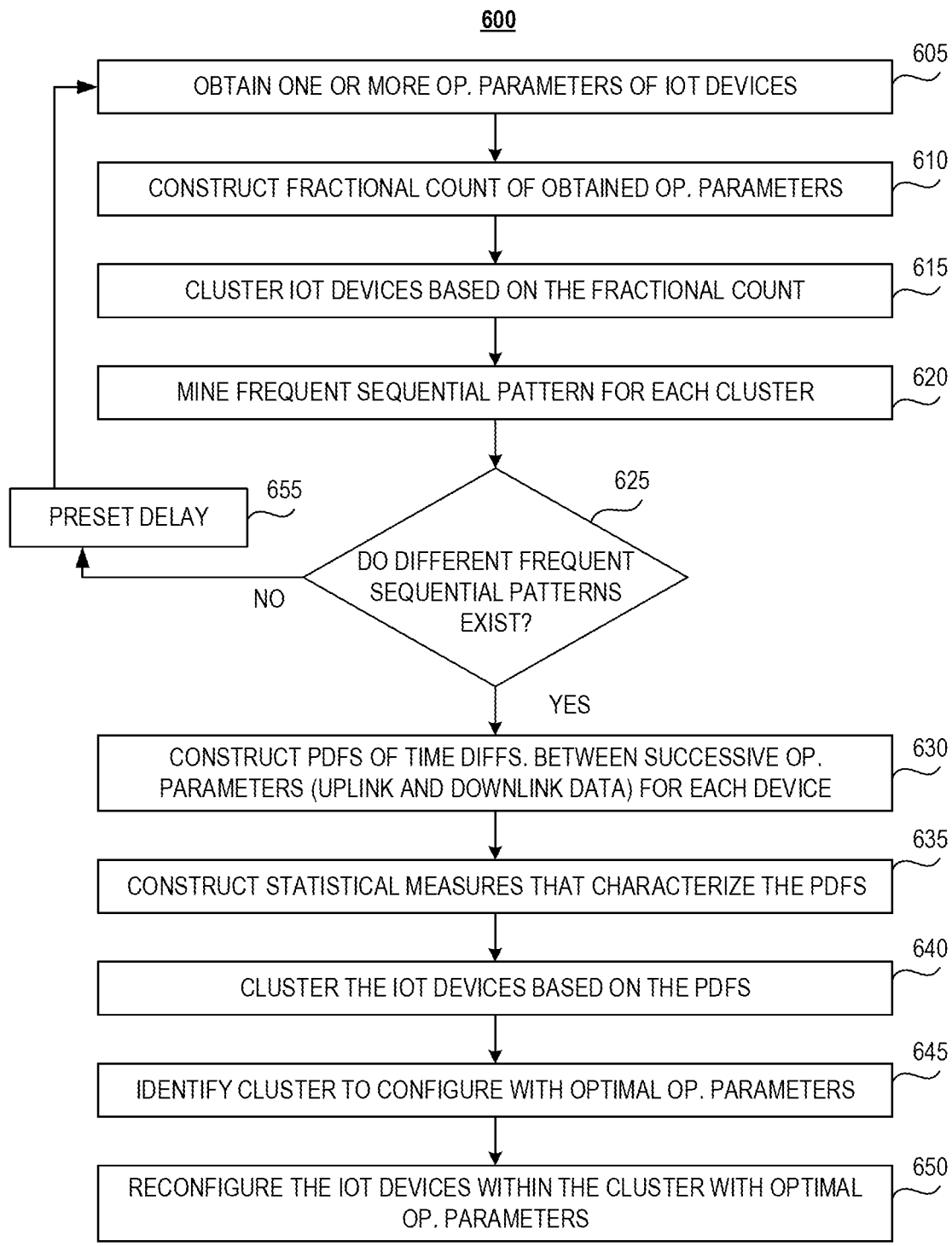
FIG. 6 illustrates a flow diagram corresponding to a method for performing optimization of operational parameters of Massive-IoT devices, according to various examples of the present disclosure.

FIG. 6 illustrates a flow diagram corresponding to a method for performing optimization of operational parameters of M-IoT devices, according to various examples of the present disclosure. In some examples, a power optimizer system (e.g., the power optimizer system 130, 330) may perform one or more of the blocks illustrated in the flow diagram 600. Although the execution of the method may be described below with reference to the power optimizer system, other suitable components for execution can be utilized (e.g., a computing system 800). In some further examples, the method may be performed by execution of instructions stored on a machine-readable storage medium, such as the storage medium 140 of the example discussed in FIG. 1, and/or in the form of electronic circuitry.

M-IoT devices deployed in an enterprise environment may monitor and record data. In some examples, the M-IoT devices may periodically communicate the recorded data to an IoT platform. The communicated data may be analyzed at the IoT platform or may be communicated to a remote service for further analysis. Based on the analysis, the IoT platform may communicate data corresponding to certain actions to be taken up by the IoT devices. Example actions may include control of certain parameters, collection of further data, switching on/off of devices deployed in the environment, etc. Further, radio access technologies or communication systems (e.g., 5G) may enable the M-IoT devices to communicate data with the IoT platform. Each IoT device deployed may exhibit certain operational parameters, such as uplink time, downlink time, idle time, etc. These parameters may be recorded by a network function, a server, or the like. The power optimizer system may analyze the operational parameters over a predetermined time horizon (e.g., 24 hours, a week, etc.) to discover any anomalies being exhibited by any of the IoT devices.

At block 605, the power optimizer system may obtain one or more operational parameters of the plurality of IoT devices. Preferably, operational parameters such as uplink data and downlink data may be obtained, as these may contribute to higher power consumption. For example, IoT devices may use various onboard resources including a processor, a storage medium, and a radio component such that stored data is retrieved and communicated via the radio component to the IoT platform. The uplink and downlink data (e.g., uplink and downlink time, number of uplinks and downlinks over a time horizon, etc.) may be retrieved from log files. The log files may be stored in at least one of a VNF or a network function at the core, an interfacing component, a server configured to store log data, or the power optimizer system itself. In one example, the interfacing device may be the secondary optimizer system 370 of FIG. 3 deployed functionally between the IoT platform and the core.

At block 610, the power optimizer system can construct a fractional count of obtained operational data for each IoT device of the plurality of the IoT devices. In one example, the fractional count can be achieved by constructing a ratio of a number of uplink or downlinks, to a total count of uplink and downlinks. As devices belonging to the same functions/use case may exhibit a different number of uplink and downlink counts over the time horizon. Thus, a fractional count may enable normalizing such differences in data corresponding to two or more devices.

At block 615, the plurality of IoT devices may be clustered based on the uplink and downlink fractional count. An unsupervised clustering technique/algorithm may be used for clustering IoT devices. Thus, the plurality of IoT devices may be clustered into a set of clusters. Each cluster may comprise devices that exhibit similar fractional counts to each other. In other words, intra-cluster devices may exhibit similar fractional counts; Whereas inter-cluster devices may exhibit fractional counts with less similarity. Herein, 'cluster' may indicate a mutually exclusive subset of the plurality of IoT devices.

In some examples, a K-Means clustering algorithm may be used for clustering the plurality of IoT devices. K-Means clustering algorithm may classify data into 'K' number of clusters. In some examples, the value of K may be selected by the power optimizer system based on one or more selection conditions, such as the number of variety of IoT devices, number of use cases, number of physical parameters being monitored, etc. According to some examples, an approach for determining the appropriate 'K' value can be by using the Elbow and Silhouette methods. The Elbow method is based on calculating the Within-Cluster Sum of Squared (WSS) Errors for various data points. The Silhouette method measures how similar a point is to its cluster (cohesion) compared to points in other clusters (separation). In some other examples, other cluster algorithms, such as mean-shift clustering, Expectation-Maximization (EM) clustering using Gaussian Mixture Models (GMM), agglomerative hierarchical clustering, or other similar clustering techniques may be used.

At block 620, for the IoT devices in each cluster, the power optimizer system may mine for frequent sequential patterns of uplink and downlink data. Frequent sequential pattern(s) mining may be used to identify patterns that contain sequences of uplinks and downlinks. In some examples, the power optimizer system may mine for patterns involving ULs, DLs, or a combination of both ULs and DLs. In some examples, a Prefix-Span algorithm may be used for sequential patterns mining. A Prefix-Span algorithm may search for and extract sequential patterns through the pattern growth method. Thus, within each cluster, devices might exhibit multiple sequential patterns.

At block 625, the power optimizer system may determine if IoT devices within a cluster are exhibiting different sequential patterns. This may be analogous to constructing PCFs and determining whether devices are exhibiting different PCFs. The determination that devices exhibit different sequential patterns may indicate that some of the IoT devices have some anomaly due to misconfiguration, error in the device(s), etc.

Based on the determination that IoT devices within a cluster exhibit different frequent sequential patterns, at blocks 630-650 the power optimizer system may further use additional AI/ML techniques to identify the optimum operational parameters.

According to some examples, at block 630, the power optimizer system may construct one or more Probability Distribution Functions (PDFs) of time differences between successive uplink and/or downlink data for each IoT device of the plurality of IoT devices. In one example, one or more of the following PDFs may be constructed: time differences between successive ULs, time differences between successive DLs, and time differences between successive ULs and DLs.

At block 635, the power optimizer may calculate statistical measures that characterize the probability distribution functions of the plurality of devices. The statistical measures may include minimum and maximum values, mean, median, mode, standard deviation, deciles, quartiles, quintiles, skewness, and/or kurtosis. The power optimizer system will assemble a vector whose dimensions may be represented by the statistical characteristics of the probability distribution functions. The below vector can be an example.

Vector (v)=[minimum, maximum, mean, median, mode, standard deviation, deciles, quartiles, quintiles, skewness, kurtosis]

At block 640, the power optimizer may cluster the IoT devices based on the probability distribution functions, such that devices with similar probability distribution functions may aggregate within the same cluster. In some examples, an unsupervised machine learning/artificial intelligence technique, such as a K-Means clustering algorithm may be used. According to some examples discussed earlier, the K value may be determined based on technical approaches, such as Elbow, Silhouette, or other similar heuristic or guaranteed methods. In some examples, the aforementioned or other heuristic methods may be used for a quick approximation of the K value. Whereas, in some other example implementations, techniques that offer a guaranteed identification may be used.

Figure 7:
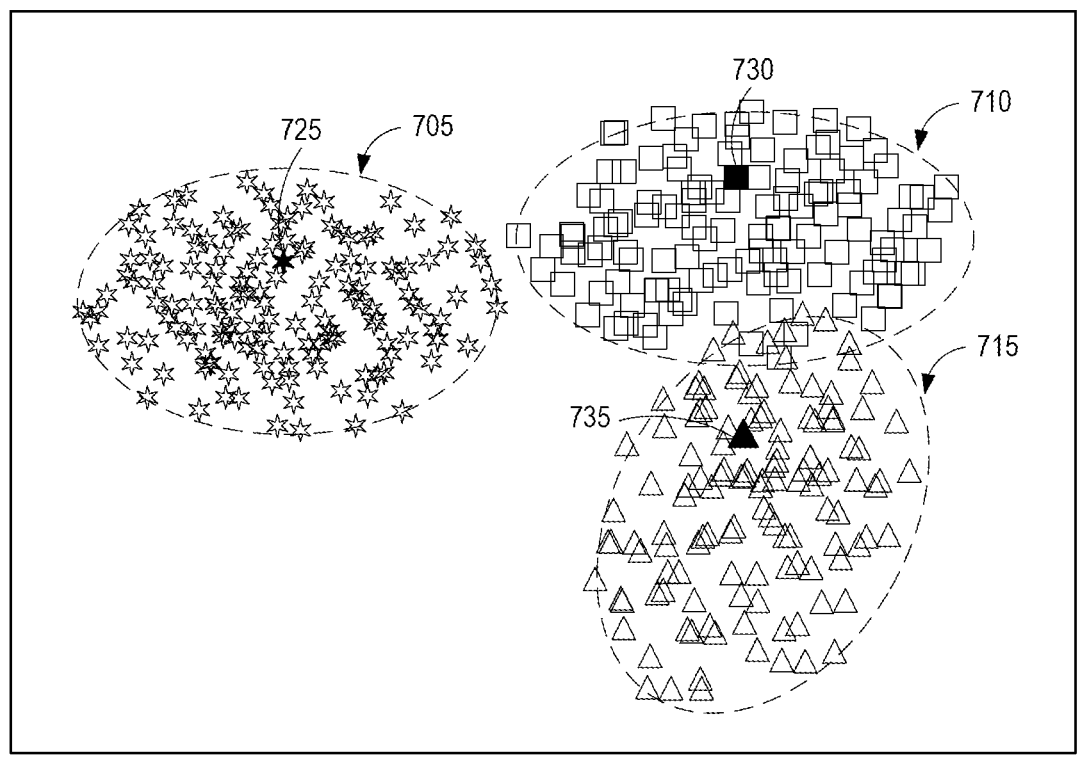
FIG. 7 illustrates a schematic view of a graph depicting three clusters of IoT devices, according to various examples.

According to various examples, a clustering algorithm may initially assign K centers by a random selection. In another example, centroids may be initially selected by way of sampling or selection means. The algorithm may further include an iterative assignment process such that each data point may be assigned to a cluster based on its proximity to a centroid. Further, for a new cluster (after assignment/reassignment), a new centroid may be determined. By way of the iterative approach, an algorithm, such as a K-Means algorithm, may perform iteration until no reassignment of data points into clusters may be possible. For example, FIG. 7 illustrates a schematic view of graph 700 depicting three clusters, according to various examples. The plurality of IoT devices may be clustered into three clusters 705, 710, and 715. Further, each cluster may include a centroid 725, 730, and 735. IoT devices with similar probability distribution functions may be classified under one cluster. Each star, square, and triangle in clusters 705, 710, and 715 may each represent a probability distribution function corresponding to an IoT device. Reference may be made to FIG. 7 in the subsequent explanation of FIG. 6.

At block 645, the power optimizer system may identify a cluster with the smallest values of features (e.g., statistical measures), among the clusters. The identified cluster and corresponding devices can be candidates for optimizing their timers to optimize energy/battery consumption. In some examples, the clusters may be ranked based on statistical characteristics of probability distribution functions. From the ranked clusters, clusters with the smallest values of statistical measure. In some examples, more than one feature of the vector may be used for representing the centroids and for ranking accordingly. The selection of feature(s) for centroid may be determined by a network administrator. In the illustrative example of FIG. 7, a skewness, as a feature, is plotted for the 75th percentile. From the ranked clusters, cluster(s) with the lowest values of a particular dimension/feature may indicate that devices within that cluster may be misconfigured. Misconfiguration may cause devices within that cluster may be high power consumption, resulting in frequent discharges of the battery. In some examples, statistical measures/characteristics may include statistics that may be descriptive coefficients capable of summarizing the entire cluster or a sample of a cluster. Some of the statistical measures can be indicative of central tendency, whereas others can be measures of spread (of data). Mean, median, and mode may be measures of central tendency. Standard deviation, variance, minimum and maximum, kurtosis, and skewness may be measures of the spread. The clusters may be ranked based on the centroid 725, 730, and 735 representing one or more of these statistical measures.

At block 650, the power optimizer system may apply the optimal parameters (e.g., active timers) that are identified during power consumption estimation to a selected cluster of IoT devices (e.g., the cluster 715 which may have the smallest ranking). In some examples, the power optimizer system may modify the active timers such as the misconfigured or sub-optimal configuration of IoT devices may be reconfigured with optimal timers. According to some examples, the IoT devices may be reconfigured with power saving timers/active timers using device management and service enablement protocols, such as Open Mobile Alliance Lightweight Machine to Machine (OMA LWM2M) protocol over a Constrained Application Protocol (CoAP) transport. In some communication systems, due to certain network conditions, such as poor signal strength, high network traffic, interference(s), or the like, the network can be unstable and/or experience low throughput. CoAP may be a specialized web transfer lightweight and compact protocol operable over unstable and/or low-throughput networks for use with constrained devices/networks. It may be used for Machine-to-Machine (M2M) applications such as smart devices, building automation, or the like. In some examples, CoAP may comply with Internet Engineering Task Force (IETF) RFC 7252 specification.

In some other examples, reconfiguration of power saving timers may be performed via network exposure functions (e.g., the NEF 380 of FIG. 3). This enables the plurality of IoT devices to establish uplink and be available for downlink for optimal data transfer, energy consumption, and battery life.

In some examples, the power optimizer system may trigger a secondary optimizer system, which may adjust parameters of the transport protocol that may be used to communicate with IoT devices (downlink communication optimization). The transport protocol parameters may be adjusted to align with optimum availability timers such that downlink attempts by the IoT applications may be efficient due to synchronization with the operational parameters. In some examples, parameters of an LwM2M protocol being used may be adjusted for optimal downlink communication.

Whereas, based on a condition that the cluster does not exhibit any difference in frequent sequential patterns, at block 660, the power optimizer system may reperform discovery phase related blocks after a preset delay. The preset delay may be set by a network administrator or dynamically selected by the power optimizer system.

The methods and processes described herein are also not limited to any particular sequence, and the blocks or states relating thereto can be performed in other sequences that are appropriate or may be performed in parallel, or in some other manner. Blocks or states may be added to or removed from the disclosed examples.

Figure 8:
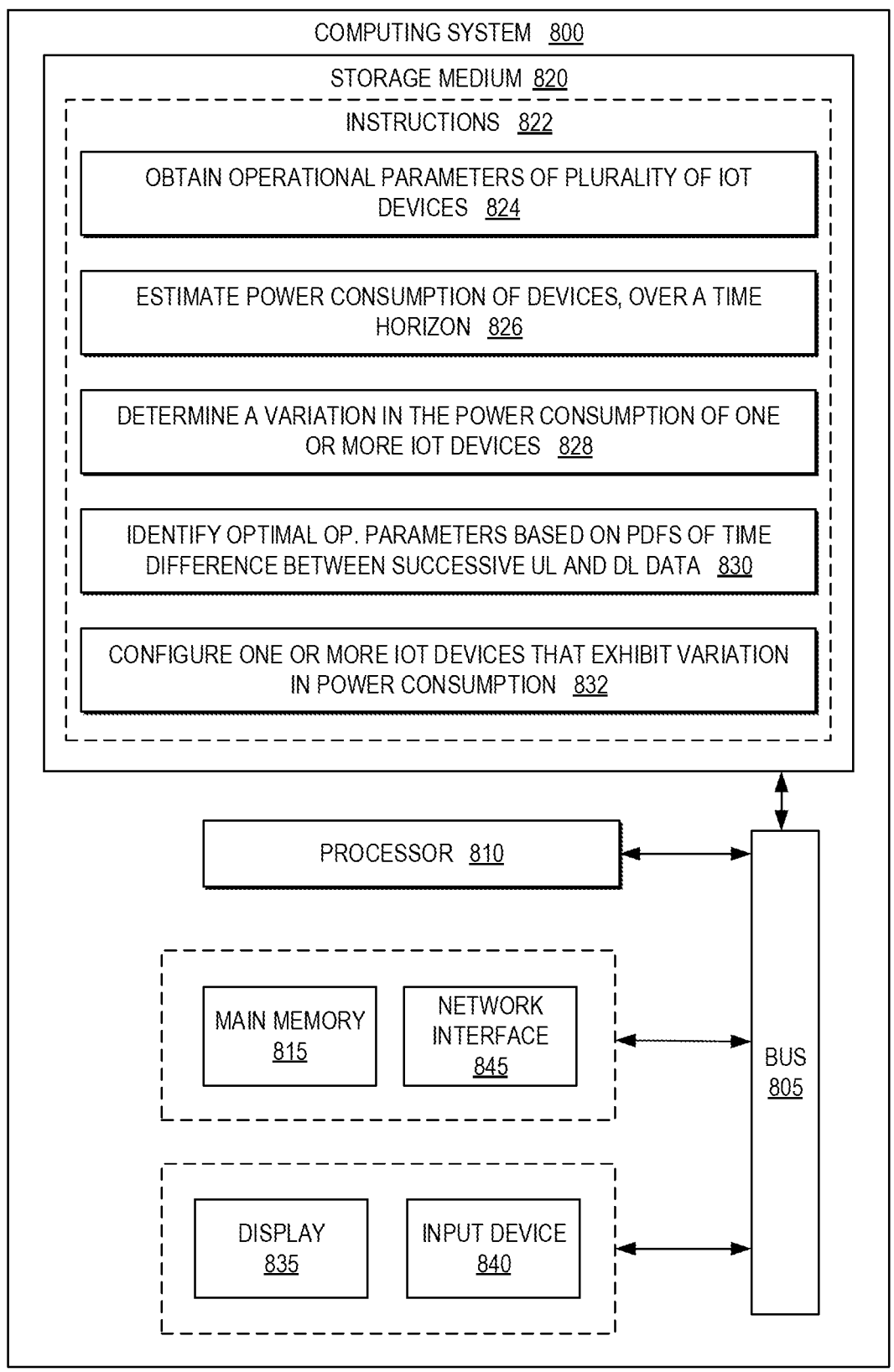
FIG. 8 depicts a block diagram of an example computing system in which the disclosed features for optimizing operational parameters of M-IoT devices may be implemented.

FIG. 8 depicts a block diagram of an example computing system 800 in which the disclosed features for optimizing operational parameters of M-IoT devices may be implemented. The computing system 800 may include a bus 805 or other communication mechanisms for communicating information, one or more processors 810 coupled with bus 805 for processing information. The processor(s) 810 may be, for example, one or more general-purpose microprocessors.

The computing system 800 also may include a main memory 815, such as a random access memory (RAM), cache, and/or other dynamic storage devices, coupled to bus 805 for storing information and instructions to be executed by processor 810. Main memory 815 also may be used for storing temporary variables or other intermediate information during the execution of instructions to be executed by processor 810. The computing system 800 further may include a storage medium 820, such as a Read-Only Memory (ROM) or other static storage device coupled to bus 805 for storing static information and instructions for processor 810. The storage medium 820 may be a "non-transitory machine-readable" type. Thus, the storage medium 820 may comprise non-volatile media and/or volatile media. Examples of non-volatile media may include optical or magnetic disks, such as storage devices.

According to some examples, storage medium 820 may store instructions 822, the instructions 822 (e.g., instructions 824-830) may be executable by the processor 810 that cause the processor to perform optimization of battery usage of a plurality of IoT devices/M-IoT devices. According to some examples, instructions 824 may be executable by the processor 810 that causes the processor 810 to obtain operational parameters of the plurality of IoT devices. instructions 826 may be executable by the processor 810 that causes the processor 810 to estimate power consumption of devices, over a time horizon. instructions 828 may be executed by the processor 810 that causes the processor 810 to determine a variation in the power consumption of one or more IoT devices out of the plurality of IoT devices. For example, a variation in operational parameters may indicate a variation in power consumption. Further, instructions 830 may be executed by the processor 810 to, in response to a determination of the variation in power consumption, identify one or more optimal operational parameters based on Probability Distribution Functions (PDFs) of the time difference between successive uplink and downlink data. instructions 832 may be executed by the processor 810 that causes the processor 810 to configure one or more IoT devices of the plurality of IoT devices that exhibit variation in power consumption. In some examples, "power consumption" may be measured in watts, watt-hour, or available life. In some examples, a power optimizer system or a computing system, as discussed herein, may be referred to as a "system"

The computing system 800 may be coupled via bus 805 to a display 835, and an input device 840. The computing system 800 may include a user interface module (not shown) to implement a Graphical User Interface that may be stored in a mass storage device as executable software codes that are executed by the computing device(s).

Non-transitory media is distinct from but may be used in conjunction with transmission media. Transmission media participates in transferring information between non-transitory media. For example, transmission media may include coaxial cables, copper wire, and fiber optics, including the wires that comprise bus 805. Transmission media can also take the form of acoustic or light waves, such as those generated during radio-wave and infra-red data communications.

The computing system 800 also may include a communication interface or a network interface 845 that may provide a two-way data communication coupling to one or more network links that are connected to one or more local networks. For example, a communication interface may be an integrated services digital network (ISDN) card, cable modem, satellite modem, or a modem to provide a data communication connection to a corresponding type of telephone line. As another example, network interface 845 may be a local area network (LAN) card to provide a data communication connection to a compatible LAN (or WAN component to communicate with a WAN). Wireless links may also be implemented. In any such implementation, network interface 845 sends and receives electrical, electromagnetic, or optical signals that carry digital data streams representing various types of information.

A network link typically provides data communication through one or more networks to other data devices. For example, a network link may provide a connection through a local network to a host computing or data equipment operated by an Internet Service Provider (ISP). The ISP in turn provides data communication services through the worldwide packet data communication network now commonly referred to as the "Internet." Local network and Internet both use electrical, electromagnetic, or optical signals that carry digital data streams. The computing system 800 can send messages and receive data, including program code, through the network(s), network link, and network interface 845.

Each of the processes, methods, and algorithms described in the preceding sections may be embodied in, and fully or partially automated by, code components executed by one or more computing systems or computing processors comprising computing hardware. The one or more computing systems or computing processors may also operate to support the performance of the relevant operations in a "cloud computing" environment or as a "software as a service" (SaaS). The processes and algorithms may be implemented partially or wholly in application-specific circuitry. The various features and processes described above may be used independently of one another or may be combined in various ways.

As used herein, a circuit might be implemented utilizing any form of hardware, software, or a combination thereof. For example, one or more processors, controllers, ASICs, PLAs, PALs, CPLDs, FPGAs, logical components, software routines, or other mechanisms might be implemented to make up a circuit. In an implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits may be used to implement such features or functionality. Where a circuit is implemented in whole or in part using software, such software can be implemented to operate with a computing or processing system capable of carrying out the functionality described with respect thereto, such as computing system 800.

Terms and phrases used in this document, and variations thereof, unless otherwise expressly stated, should be construed as open-ended as opposed to limiting. Adjectives such as "standard," "known," and terms of similar meaning should not be construed as limiting the item described to a given time period or to an item available as of a given time, but instead should be read to encompass conventional, traditional, normal, or standard technologies that may be available or known now or at any time in the future. In general, the word "component," "system," "database, and the like, as used herein, can refer to logic embodied in hardware or firmware, or to a collection of software instructions, possibly having entry and exit points, written in a programming language. The presence of broadening words and phrases such as "one or more," "at least," "but not limited to" or other like phrases in some instances shall not be read to mean that the narrower case is intended or required in instances where such broadening phrases may be absent.

What is claimed is:

1. A system comprising:
   a processor; and
   a machine-readable storage medium comprising instructions, the instructions executable by the processor that cause the processor to:
   obtain one or more operational parameter records of a plurality of Internet of Things (IoT) devices that are connected to a network;
   estimate a Power Cost Function based on the one or more operational parameter records for the plurality of IoT devices, wherein estimating the Power Cost Function for a respective IoT device comprises correlating a connectivity attempt of the respective IoT device during an active period with the network and a transmission attempt of an IoT application with the respective IoT device;
   determine a variation in the Power Cost Function (PCF) of one or more IoT devices out of the plurality of IoT devices;
   based on a determination of the variation, identify one or more optimal operational parameters; and configure the one or more IoT devices of the plurality of IoT devices with the one or more optimal operational parameters.

2. The system of claim 1, wherein the instructions to determine the variation include instructions that cause the processor to:
cluster the plurality of IoT devices into a set of clusters based on the operational parameter records, wherein the operational parameter records include at least one of an uplink data, a downlink data, an active timer, and a sleep timer for each IoT device of the plurality of IoT devices over a predetermined time horizon.

3. The system of claim 2, further comprising instructions executable by the processor to:
within each cluster of the set of clusters, mine a fractional count of an uplink and a downlink data for a frequent sequential pattern; and
determine a variation in the frequent sequential pattern between devices belonging to one cluster.

4. The system of claim 2, wherein the plurality of IoT devices are clustered using an unsupervised machine learning technique and based on a fractional count of the uplink data and the downlink data.

5. The system of claim 1, wherein the instructions to estimate the PCF includes instructions to:
refer to a consumption model that includes power consumption values for one or more operations performed by an IoT device.

6. The system of claim 1, further comprising instructions executable by the processor to:
apply unsupervised machine learning techniques to:
determine statistics of an interval of time between successive uplink and downlink from the operational parameter records for each IoT device of the plurality of IoT devices; and
determine a probability distribution function for the interval between successive uplink and downlink information for each IoT device of the plurality of IoT devices, and characterize one or more statistical measures from the probability distribution function.

7. The system of claim 6, further comprising instructions executable by the processor to:
cluster the plurality of IoT devices into a set of clusters based on the probability distribution function; and
rank the set of clusters based on a centroid of each cluster represented by the one or more statistical measures; and
identify one or more clusters from the ranked clusters based on a frequency of occurrence of uplink and downlink operations.

8. The system of claim 1, wherein the system is deployed on a Virtual Network Function (VNF), and wherein the VNF is deployed on a core of a communication system.

9. The system of claim 1, further comprising instructions executable by the processor to:
obtain the one or more operational parameter records from a secondary optimizer system, wherein the secondary optimizer system interfaces a core of a communication system and an Internet of Things (IoT) platform; and
trigger the secondary optimizer system to align one or more parameters of transport protocol with the one or more optimal operational parameters of the plurality of IoT devices.

10. A method comprising:
obtaining one or more operational parameter records of a plurality of Internet of Things (IoT) devices that are connected to a network;

estimating power consumption of each IoT device of the plurality of IoT devices, based on the obtained operational parameter records by correlating a connectivity attempt of a respective IoT device during an active period with the network and a transmission attempt of an IoT application with the respective IoT device;
determining a variation in the power consumption of one or more IoT devices out of the plurality of IoT devices;
based on a determination of the variation in the power consumption, identifying one or more optimal operational parameters from the estimated power consumption; and
configuring one or more IoT devices of the plurality of IoT devices with the one or more optimal operational parameters.

11. The method of claim 10, wherein the determining variation in the power consumption includes:
clustering the plurality of IoT devices into a set of clusters based on at least one of a fractional count of an uplink data or a downlink data, wherein the uplink data and the downlink data are obtained from the one or more operational parameter records; and
identifying one or more clusters out of the set of clusters that exhibit different frequent sequential patterns within the cluster.

12. The method of claim 10, wherein the identifying the one or more optimal operational parameters includes:
selecting one or more optimal operational parameters from the estimated power consumption;
constructing a Probability Distribution Function (PDF) of a time difference between a successive uplink and a downlink for each IoT device; and
constructing one or more statistical measures characterizing the PDFs.

13. The method of claim 12, further comprising:
clustering the plurality of IoT devices into a set of clusters based on the PDF using one or more unsupervised machine learning techniques.

14. The method of claim 12, wherein identifying the one or more clusters includes:
ranking the set of clusters based on a centroid of the set of clusters represented by the one or more statistical measures; and
selecting one or more clusters with a smallest value of the one or more statistical measures for optimizing one or more IoT devices of the selected clusters.

15. A non-transitory storage medium storing instructions, the instructions, executable by a processor to:
obtain one or more operational parameter records of a plurality of Internet of Things (IoT) devices that are connected to a network deployed in a Massive-IoT deployment (M-IoT), wherein the one or more operational parameters include uplink data and downlink data;
estimate a Power Cost Function based on the one or more operational parameters for the plurality of IoT devices, wherein estimating the Power Cost Function for a respective IoT device comprises correlating a connectivity attempt of the respective IoT device during an active period with the network and a transmission attempt of an IoT application with the respective IoT device;
determine a variation in the Power Cost Function (PCF) of one or more IoT devices out of the plurality of IoT devices;
based on a determination of the variation, identify one or more optimal operational parameters; and configure the one or more IoT devices of the plurality of IoT devices with the one or more optimal operational parameters.

16. The non-transitory storage medium of claim 15, including further instructions to:
   align one or more parameters of a transport protocol with at least one of an existing operational parameters or the optimal operational parameters of the one or more IoT devices, wherein the transport protocol is used by the network to communicate with the IoT device.

17. The non-transitory storage medium of claim 16, wherein the transport protocol is a lightweight and compact protocol operable over unstable and low-throughput networks.

18. The non-transitory storage medium of claim 15, wherein the operational parameter records are obtained for each IoT device of the plurality of IoT devices over a time series that is contiguous and non-overlapping.

19. The non-transitory storage medium of claim 15, wherein the operational parameter records include data corresponding to one or more connectivity attempts by the plurality of IoT devices and one or more transmission attempts to the plurality of IoT devices, wherein the one or more connectivity attempts are determined from one or more existing availability timers.

* * * * *